United States Patent
Oku et al.

(10) Patent No.: US 6,739,354 B2
(45) Date of Patent: May 25, 2004

(54) RESERVOIR UNIT

(75) Inventors: Toshihide Oku, Ohbu (JP); Nobuo Suzuki, Ohbu (JP)

(73) Assignee: Aisan Kogyo Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 10/400,802

(22) Filed: Mar. 28, 2003

(65) Prior Publication Data

US 2003/0188722 A1 Oct. 9, 2003

(30) Foreign Application Priority Data

Apr. 3, 2002 (JP) ........................................ 2002-101250

(51) Int. Cl.[7] ................................................ F02B 33/00
(52) U.S. Cl. .................. 137/565.22; 137/544; 137/545; 123/510
(58) Field of Search ................................. 123/509, 510; 137/574, 565.34, 565.24, 573, 549, 552, 545, 544, 565.22; 417/363

(56) References Cited

U.S. PATENT DOCUMENTS

| | | | | |
|---|---|---|---|---|
| 5,045,192 A | * | 9/1991 | Terhune ....................... 210/232 |
| 5,070,849 A | * | 12/1991 | Rich et al. .................... 123/509 |
| 5,394,902 A | * | 3/1995 | Shibao .................... 137/565.17 |
| 5,718,208 A | * | 2/1998 | Brautigan et al. ........... 123/516 |
| 6,213,100 B1 | * | 4/2001 | Johansen ..................... 123/509 |
| 6,216,734 B1 | * | 4/2001 | Umetsu et al. ......... 137/565.24 |

* cited by examiner

*Primary Examiner*—A. Michael Chambers
(74) *Attorney, Agent, or Firm*—Stevens, Davis, Miller & Mosher, LLP

(57) ABSTRACT

In order to provide a simply-structured fuel filter which permits soaking at least part of a filter unit all the time in fuel in a reservoir, a reservoir unit is configured of a resin-built cylindrical reservoir having a bottom arranged on the bottom of a fuel tank, a primary filter installed near the inner bottom of that reservoir and a fuel pump sucking fuel in the reservoir through the primary filter, wherein projections protruding upward from the inner bottom of the reservoir are integrally molded and engaging holes to engage with those projections are bored in the circumference of the primary filter.

4 Claims, 9 Drawing Sheets

RESERVOIR UNIT

BACKGROUND OF THE INVENTION

1. Field of the Invention

The present invention relates to a reservoir unit to be installed in the fuel tank of a motor vehicle or the like, and more particularly to a structure for fixing a fuel filter to be fitted to the suction port of a fuel pump in the reservoir.

2. Description of the Related Art

A technique by which a cylindrical reservoir having a bottom is installed in a fuel tank and a fuel pump is provided in that reservoir to enable fuel in the reservoir to be sucked by the fuel pump and delivered out of the fuel tank has been developed. The suction port of the fuel pump is fitted with a filter consisting of a bag formed of fine meshes to prevent foreign matter from being sucked by the fuel pump.

In order to consume fuel in the reservoir to the last drop, the filter should be arranged close to the inner bottom of the reservoir because, if the filter shifts to a higher position in the reservoir, any fuel that is in a lower position than the filter would remain unutilized.

As stated above, the filter is fitted to the suction port of the fuel pump. For this reason, according to the related art, positioning of the fuel pump relative to the reservoir indirectly positions the filter relative to the reservoir. Although positioning of the fuel pump relative to the reservoir of course results in positioning of the filter near the inner bottom of the reservoir, there is no deliberate means to position the filter relative to the reservoir.

For this reason, the filter may stay away from the inner bottom of the reservoir. Especially in the process of positioning a fuel pump fitted with a filter relative to the reservoir, the filter is apt to be away from the inner bottom of the reservoir, and may be positioned in this state of being away from the inner bottom of the reservoir.

In view of this problem, the main object of the present invention is to provide a simple structure which enables the filter to be kept in the vicinity of the inner bottom of the reservoir.

SUMMARY OF THE INVENTION

In order to achieve the object stated above, according to the invention, in a reservoir unit comprising a cylindrical reservoir having a bottom arranged on the bottom of a fuel tank, a filter installed near the inner bottom of that reservoir, and a fuel pump for sucking fuel in the reservoir through that filter, projections protruding upward from the inner bottom of the reservoir are integrally molded, and engaging holes to engage with the projections are bored in the circumference of the filter, the projections and the holes constituting engaging means.

This configuration enables at least part of the bottom of the filter to be positioned near the bottom of the reservoir, and accordingly at least part of the filter can be kept soaked in fuel even if the remaining quantity of fuel in the reservoir is very small, resulting in an increased quantity of consumable fuel.

DESCRIPTION OF THE PREFERRED EMBODIMENTS

The following paragraphs enumerate principal features of the preferred embodiments of the present invention to be described below.

(Mode 1) Snap fits protruding upward are integrally formed with the inner bottom of the reservoir as a protruding portion, and engaging holes are bored in the circumference of the primary filter to engage with the snap fits and thereby to constitute engaging means.

(Mode 2) A primary fuel filter is composed of a bag filter of fine-texture nylon and a resin-built frame inserted therein and securing a certain volume within the bag.

(Mode 3) The frame consists of swelled portions pressing a plurality of positions of the bottom of the bag filter toward the bottom of the reservoir and a frame body to maintain other parts of the bottom of the bag filter in a position slightly away from the bottom of the reservoir.

(Mode 4) Engagement of engaging holes bored in the circumference of the primary fuel filter with the snap fits protruding upward from the bottom of the reservoir results in pressing of the plurality of swelled portions toward the bottom of the reservoir.

(Mode 5) A jet pump, the primary fuel filter, the fuel pump, the pressure regulator and a secondary fuel filter are assembled with the reservoir. In other words, the jet pump, primary fuel filter, fuel pump, pressure regulator and secondary fuel filter are put into an assembly in advance with the reservoir.

[Embodiments]

A reservoir unit according to a first preferred embodiment of the present invention will now be described in detail with reference to FIG. 1.

Figure 1:
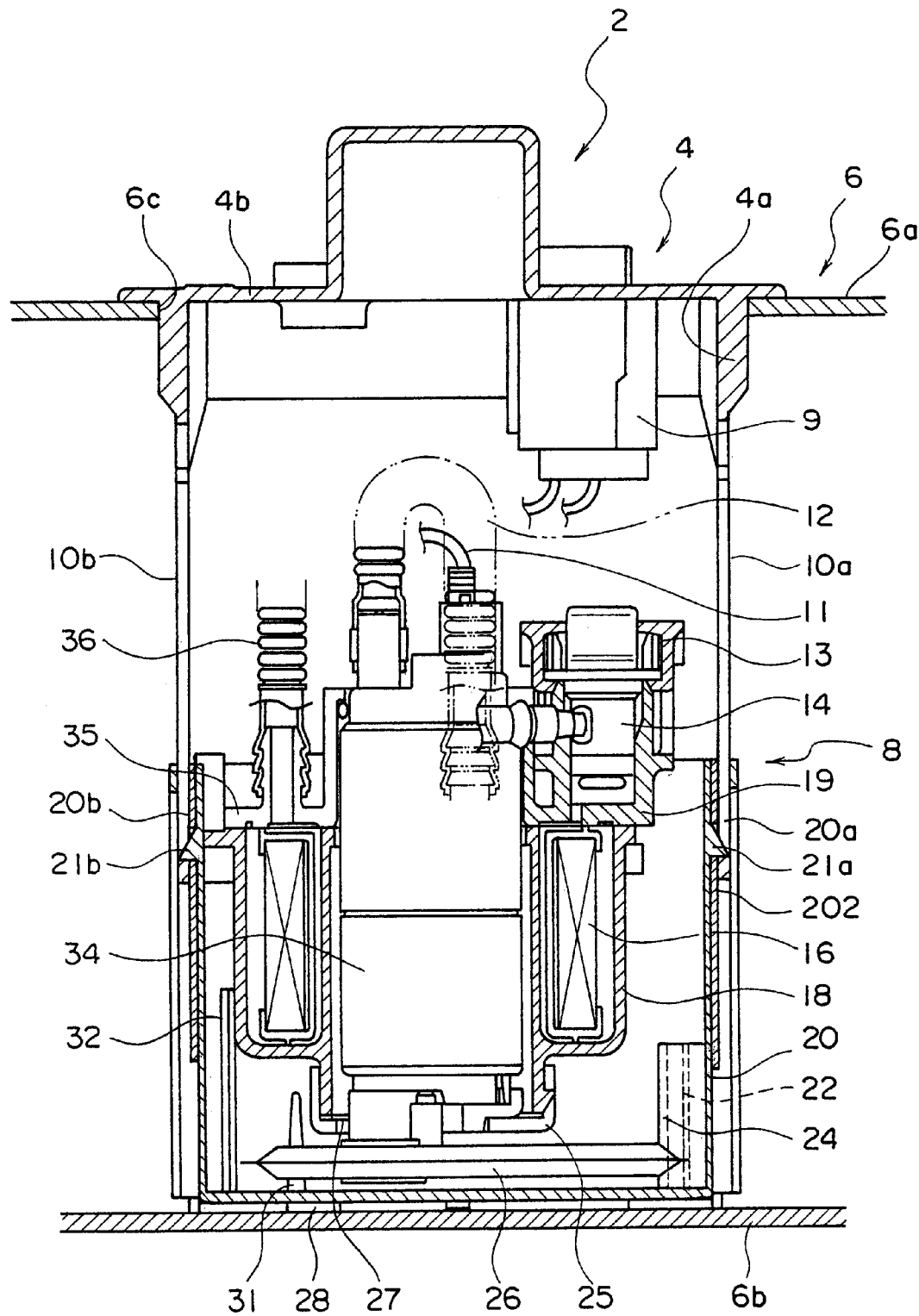
FIG. 1 is a schematic side view of a whole reservoir unit according to the present invention.

As shown in FIG. 1, a reservoir unit 2 of the embodiment comprises an upper subunit 4 and a lower subunit 8, and installed in a fuel tank 6 when it is used. The lower subunit 8 is provided with a reservoir 20 in a cylindrical shape having a bottom (i.e. shaped substantially like a glass), a primary filter 26, a fuel pump 34, a pressure regulator 14 and a secondary filter 16. The primary filter 26, the fuel pump 34, the pressure regulator 14 and the secondary filter 16 are accommodated in the reservoir 20 to be positioned, and constitute an assembly.

The primary filter 26, fuel pump 34, pressure regulator 14, secondary filter 16, reservoir 20 and upper subunit 4 will be described in detail below in this sequence.

Figure 4A:
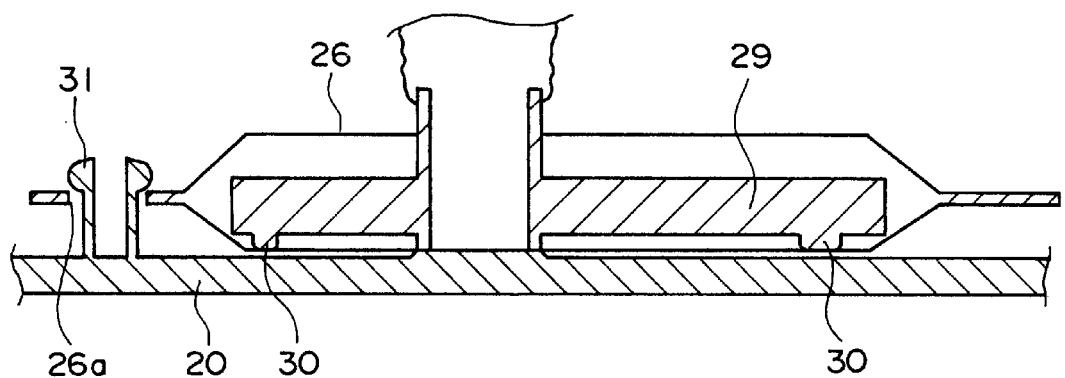
FIG. 4A is a sectional view of a primary filter.
Figure 4B:
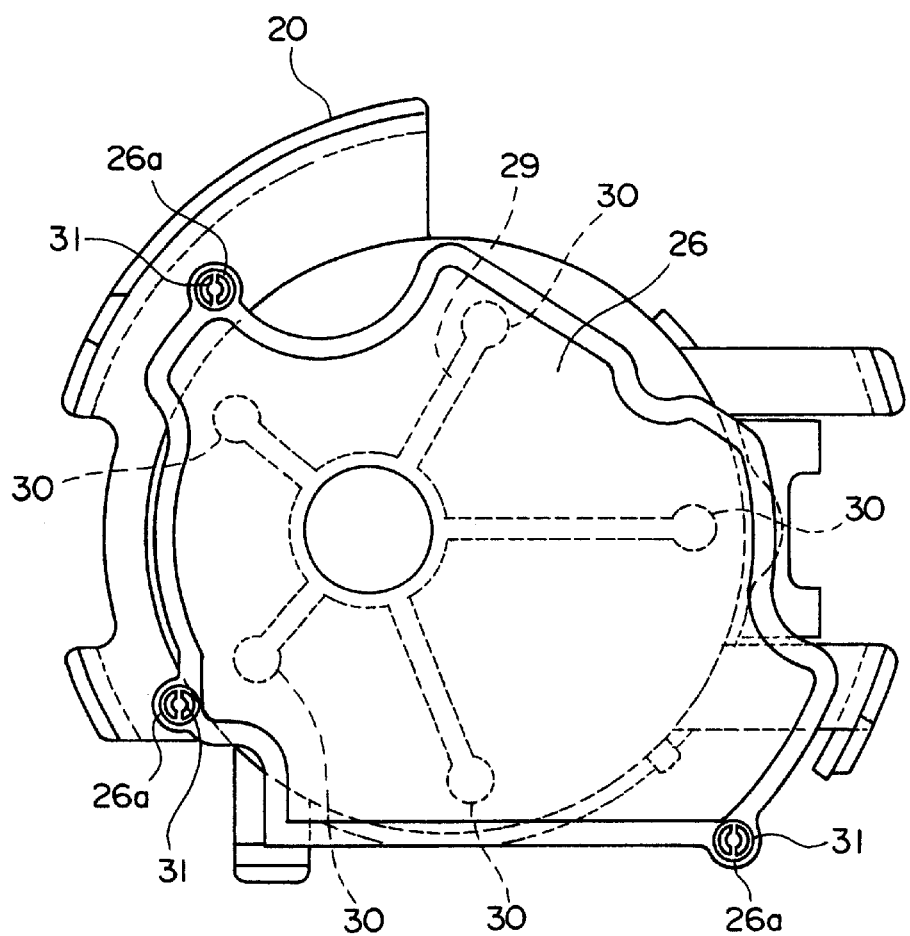
FIG. 4B is a plan view of the same.

The primary filter 26 is configured of a bag filter of fine-texture nylon and a resin-built frame inserted into and securing a certain volume within the bag. The inner space of the bag filter is continuous to the suction port of the fuel pump 34. The primary filter 26 is accommodated in the reservoir 20 and arranged along the inner bottom of the reservoir 20. As shown in FIGS. 4A and 4B, the frame is composed of a swelled portion 30 pressing a few parts of the bottom of the bag filter against the inner bottom of the reservoir 20, and a frame body 29 keeping the other parts of the bottom of the bag filter in a position slightly away from the bottom of the reservoir 20. This arrangement serves to secure spacing between the primary filter 26 and the inner bottom of the reservoir 20 to enable the whole filtering face to perform the filtering function.

On the circumference of the primary filter 26 are bored engaging holes 26a to fit snap fits 31 protruding upward from the inner bottom of the reservoir 20. Engagement of the engaging holes 26a with the snap fits 31 prevents the primary filter 26 from floating away from the inner bottom of the reservoir 20, thereby helping to keep it in a position along the inner bottom of the reservoir 20.

The meshes of the bag filter of fine-texture nylon, when exposed from the fuel, are clogged by the fuel as it surface tension works. As long as even a small part of the bag filter is soaked in the fuel, the fuel enters into the filter through the soaked part of the bag, and accordingly the bag filter can still absorb the fuel even if the remaining quantity of the fuel is so small that the top of the bag filter is exposed. Any foreign matter in the fuel is substantially removed by the primary filter 26, and the remainder is further removed by the secondary filter 16 to be elaborated upon afterwards. The fuel cleared of foreign matter by the primary filter 26 is sucked by the fuel pump.

As shown in FIG. 1, the fuel pump 34 is formed in a substantially vertical columnar shape, and has at its bottom a fuel suction pipe (not shown). To the fuel suction pipe (not shown) is connected the primary filter 26. At the top end of the fuel pump 34, there are provided an electrical connector 11 and a fuel discharge pipe 12.

The fuel pump 34, driven by being supplied with electricity through the electrical connector 11, sucks fuel in the reservoir 20 to be described afterwards from the primary filter 26, raises its pressure, and discharges it from the fuel discharge pipe 12.

To the fuel discharge pipe 12 is connected the pressure regulator 14. The pressure regulator 14 is a relief valve which, when the pressure in the fuel discharge pipe 12 surpasses a prescribed level, lets the fuel escape from the fuel discharge pipe 12 to keep the pressure within the fuel discharge pipe 12 at the prescribed level. It maintains the pressure of the fuel to be fed to the secondary filter 16, and eventually that of the fuel fed to the internal combustion engine, at the prescribed level. The fuel having escaped from the pressure regulator 14 is guided by piping (not shown in FIG. 1) into a jet pump 40 to be described afterwards. The pressure regulator 14 is accommodated in the pressure regulator fitting part 19 of a filter cover 35 to be elaborated upon afterwards, and is supported in a state of being prevented from coming off by the assembling of its cap 13 into the pressure regulator fitting part 19 of the filter cover 35.

Around the fuel pump 34 is formed a doughnut-shaped vessel 18, in which the secondary filter 16, also doughnut-shaped, is accommodated and covered by the filter cover 35 which blocks the top opening of the doughnut-shaped vessel 18. The doughnut-shaped vessel 18 and the filter cover 35 are molded resin items. The doughnut-shaped vessel 18 is bisected by the doughnut-shaped secondary filter 16 into an inner chamber and an outer chamber, and the fuel discharge pipe 12 leads to the outer chamber of the doughnut-shaped vessel 18. To the inner chamber of the doughnut-shaped vessel 18 leads a fuel feed pipe 36. The fuel delivered from the fuel pump 34 passes the secondary filter 16 from the outer chamber of the doughnut-shaped vessel 18 to reach the inner chamber of the doughnut-shaped vessel 18 and enters the fuel feed pipe 36. The fuel feed pipe 36 penetrates the upper subunit 4 and extends out of the fuel tank 6. In this embodiment according to the invention, the fuel feed pipe 36 is connected to an injector via a delivery pipe (neither shown), and supplies the injector with fuel which is raised in pressure by the fuel pump 34, regulated by the pressure regulator 14 to a constant pressure level, and cleared of foreign matter by the primary filter 26 and the secondary filter 16. Into the hollow space within the doughnut-shaped vessel 18 is inserted the fuel pump 34 from its bottom opening. Assembling of a fitting stay 25 to the bottom of the doughnut-shaped vessel 18 results in supporting of the fuel pump 34 in a state in which the pump is prevented from coming off. A cushion rubber 27 intervenes between the fuel pump 34 and the fitting stay 25 to elastically support the fuel pump 34.

Next will be described the upper subunit 4 with reference to FIG. 1 and FIGS. 5A and 5B. The upper subunit 4, which is a molded resin item, is provided with a substantially round disk portion 4b fixed to the top face 6a of the fuel tank 6 to block the opening of the fuel tank 6, a cylindrical wall 4a protruding from the bottom face of the disk portion 4b, and a pair of guide rails 10a and 10b extending downwards from the cylindrical wall 4a. The cylindrical wall 4a can be fit into the fitting holes 6c of the fuel tank 6. As shown in FIG. 1, fitting of the upper subunit 4 to block the fitting holes 6c of the fuel tank 6 results in arrangement and positioning of the reservoir unit 2 in the fuel tank 6. The outer circumference of the upper subunit 4 is mounted over the edges of the fitting holes 6c of the fuel tank 6 via a seal gasket (not shown), and fastened over the fitting holes 6c of the fuel tank 6 with bolts (not shown). This results in fixing of the upper subunit 4 to the fuel tank 6.

The upper subunit 4 has an electrical connector 9 provided with terminals vertically penetrating the disk portion 4b. To the electrical connector 9 of the upper subunit 4 is electrically connected an electrical connector 11 of the fuel pump 34 on the lower side of the upper subunit 4. The electrical connector 9 of the upper subunit 4 is also electrically connected on the top side of the upper subunit 4 to a connector for power feed (not shown).

Figure 5A:
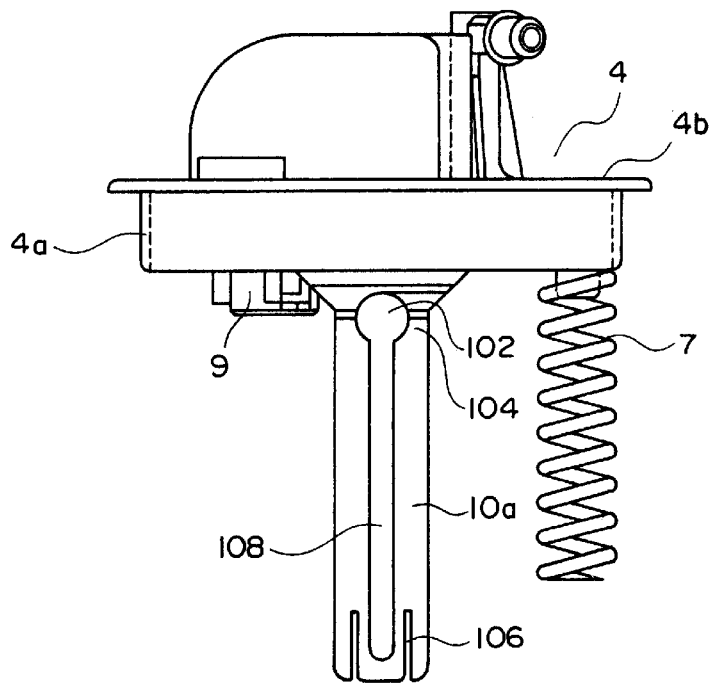
FIG. 5A is a front view of an upper subunit.
Figure 5B:
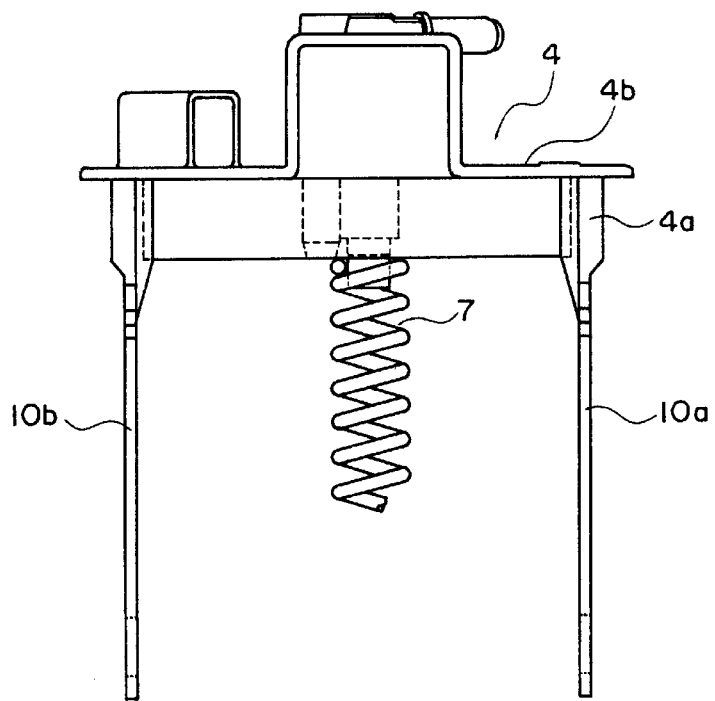
FIG. 5B is a side view of the same.

As well illustrated in FIGS. 5A and 5B, the pair of guide rails 10a and 10b extend from the cylindrical wall 4a of the upper subunit 4. Each of the guide rails 10a and 10b is formed in a flat plate shape. A long hole 108 is formed along the center line of each of the guide rails 10a and 10b. At the top end of the long hole 108 is formed a large hole 102, and the two sides of the large hole 102 constitute a frail portion 104. At the tip of each of the guide rails 10a and 10b are formed slits 106 extending upwards from the lower end. The slits 106 are formed on both sides of the long hole 108.

Figure 6:
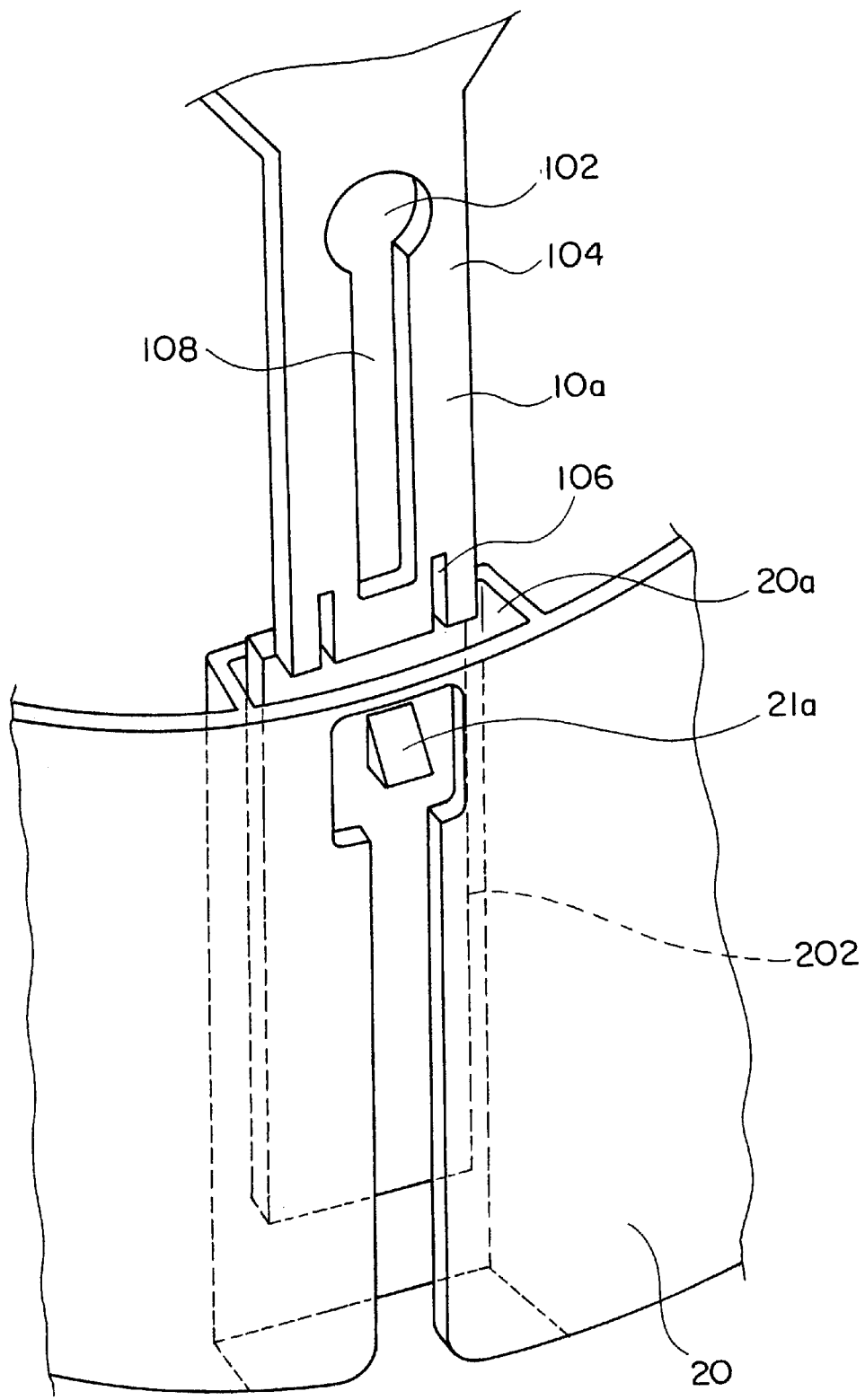
FIG. 6 is a perspective view showing how guide rails and a sheath-shaped slot engage with each other.
Figure 7:
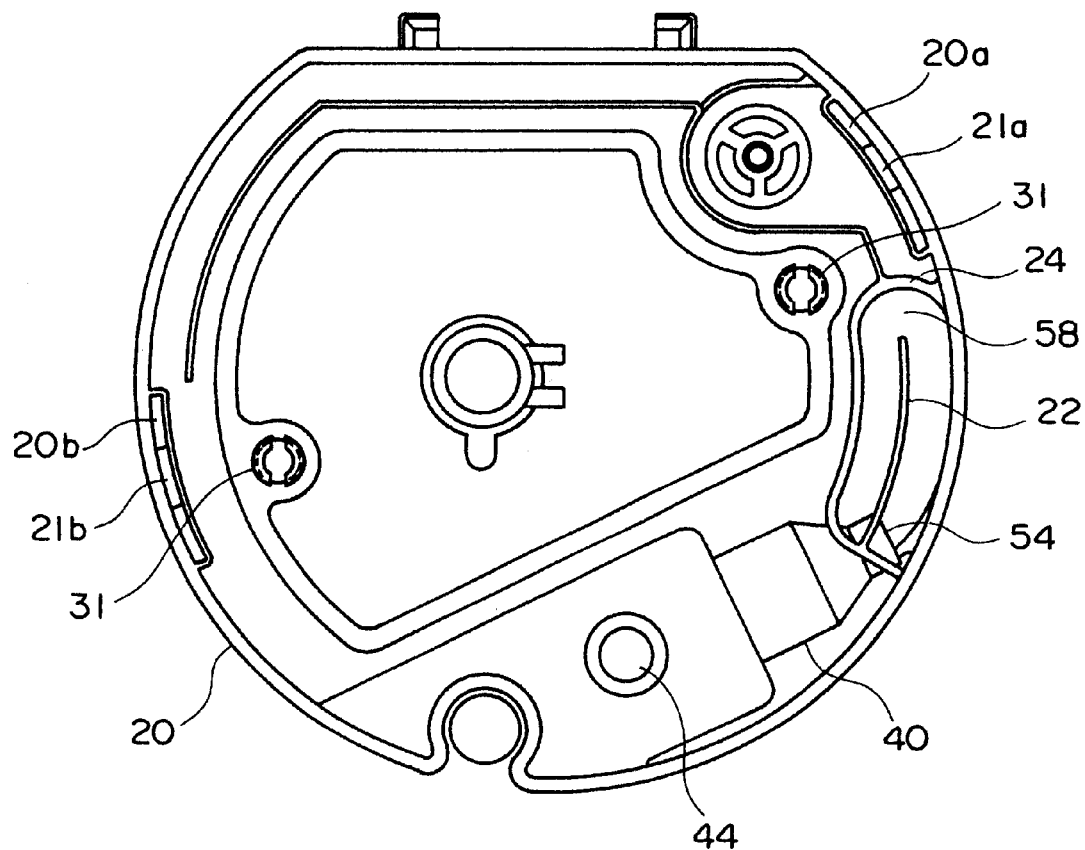
FIG. 7 is a plan view of a reservoir according to a second preferred embodiment of the invention.
Figure 8:
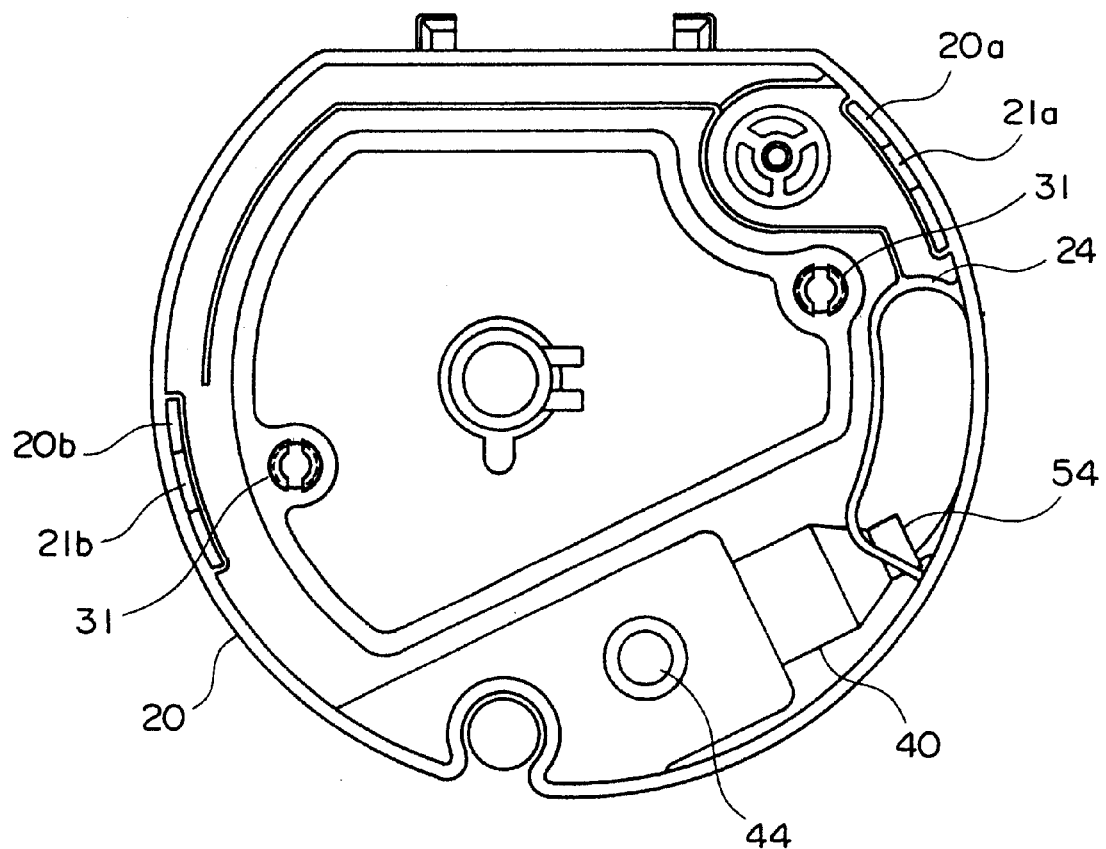
FIG. 8 is a plan view of a reservoir according to a third preferred embodiment of the invention.
Figure 9:
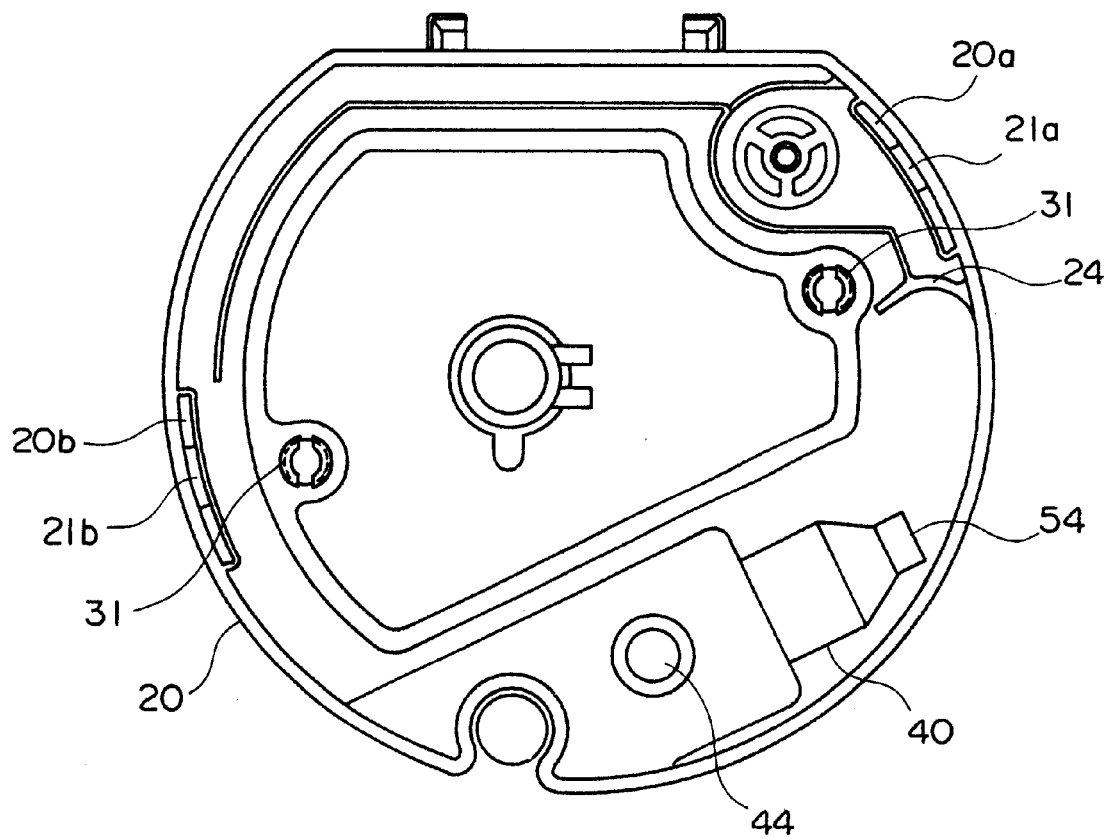
FIG. 9 is a plan view of a reservoir according to a fourth preferred embodiment of the invention.

As well illustrated in FIG. 6, the reservoir 20 has sheath-shaped slots 20a and 20b to accept the pair of guide rails 10a and 10b, and moves toward or away from the upper subunit 4 along the pair of guide rails 10a and 10b. Within the sheath-shaped slots 20a and 20b are provided tapered projections 21a and 21b on which the guide rails 10a and 10b are slidable in only one direction. When the upper subunit 4 and the lower subunit 8 are assembled, the guide rails 10a and 10b are elastically deformed to ride over the tapered projections 21*a* and 21*b*. During normal use, the tapered projections 21*a* and 21*b* are engaged with the ends of the long holes 108 of the guide rails 10*a* and 10*b* so that the upper subunit 4 and the lower subunit 8 may not sever from each other.

Inside the sheath-shaped slots 20*a* and 20*b* to accept the guide rails 10*a* and 10*b* are arranged metal plates 202. They can prevent, when the guide rails 10*a* and 10*b* and the slots 20*a* and 20*b* on the reservoir side to accept them slide relative to each other, squeaking noise or the like from arising. There is no particular limitation to the material of the metal plates 202, but stainless steel, which is resistant to corrosion, has been selected for this embodiment of the invention.

Between the upper subunit 4 and the lower subunit 8 is provided a compression spring 7 (not shown in FIG. 1) as the elastic member, and the spring 7 presses the lower subunit 8 toward the bottom 6*b* of the fuel tank 6. The fuel tank 6 is blow-molded of resin, and is subject to deformation by a change in the quantity of remaining fuel and/or a change in atmospheric temperature. Therefore, the lower subunit 8 is pressed all the time toward the bottom 6*b* of the fuel tank 6 correspondingly to the deformation of the fuel tank 6.

When a vehement acceleration works on the fuel tank 6, the reservoir unit 2 tends to be displaced relative to the fuel tank 6. If the guide rails 10*a* and 10*b* are firm then, the disk portion 4*b* of the upper subunit 4 may be destroyed when the reservoir unit 2 is displaced relative to the fuel tank 6. The disk portion 4*b* of the upper subunit 4 is especially subject to destruction at the roots of the guide rails 10*a* and 10*b*. When the disk portion 4*b* is destroyed, the fuel may escape from the fuel tank 6. In the embodiment, as the frail portion 104 is formed in the guide rails 10*a* and 10*b*, even if a vehement acceleration works on the fuel tank 6 and the reservoir unit 2 is displaced relative to the fuel tank 6, the frail portion 104 will be destroyed first, and therefore the disk portion 4*b* will not be. As there is the frail portion 104, it can prevent the disk portion 4*b* from being damaged, so as to leak the fuel. To add, even if the frail portion 104 is destroyed, the fuel pump can continue to work because electric cables to drive the fuel pump and the hose to feed fuel remain connected. Thus it is possible to continue to feed fuel to the engine, and thereby enabling the motor vehicle to run as required for ensuring safety.

Figure 2A:
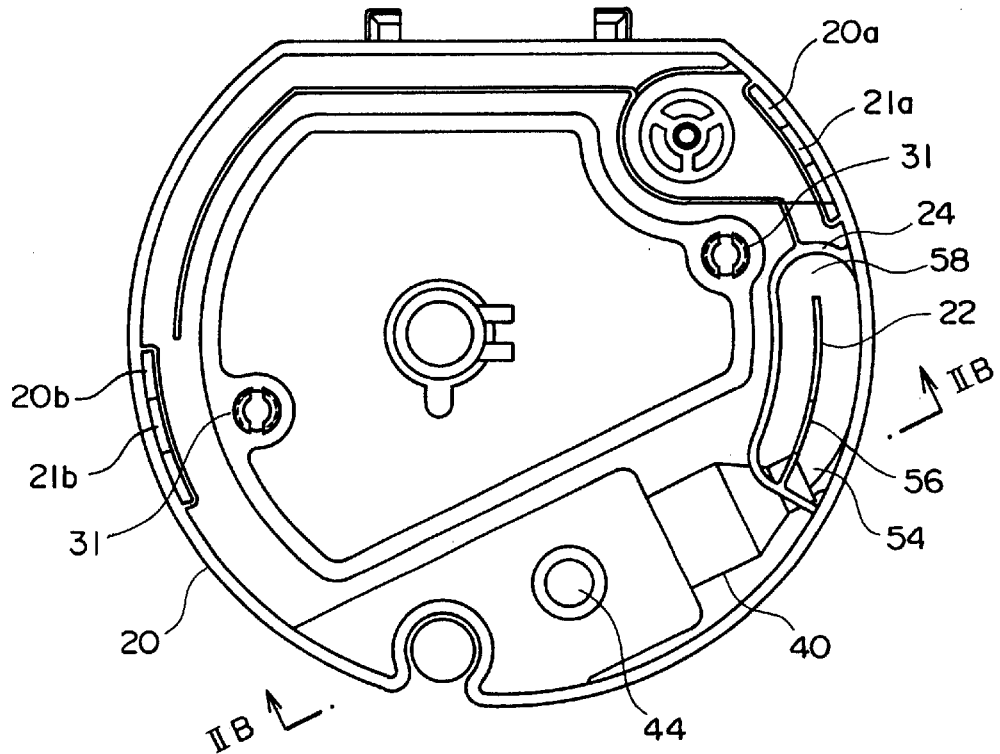
FIG. 2A is a plan view of a reservoir according to a first preferred embodiment of the invention.

FIG. 2A shows a plan view of the reservoir 20, wherein the positions of the snap fits 31 are altered from those shown in FIGS. 4A and 4B. Two snap fits 31 are sufficient to keep the primary filter 26 arranged along the bottom of the reservoir 20.

Figure 2B:
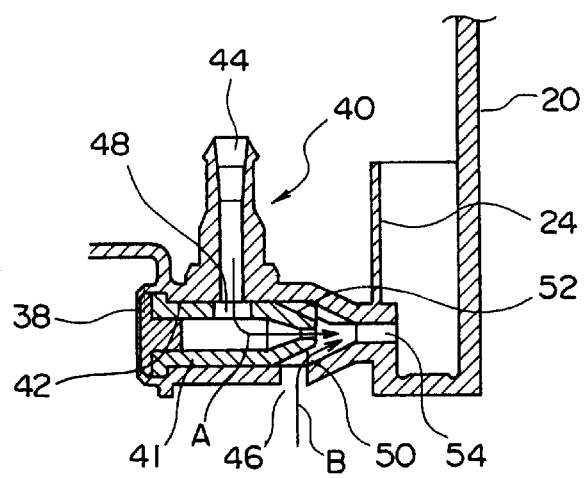
FIG. 2B is a sectional view taken along a center line (line IIB—IIB) of a jet pump in FIG. 2A.

FIG. 2B shows a sectional view of the jet pump 40 taken along the center line (a line IIB—IIB) shown in FIG. 2A. In the bottom of the reservoir 20, which is composed of a molded item of resin, is formed a concave 42 to accept a jet pump body 41 of the jet pump 40, and openings 44 and 46 communicating to the concave are formed, penetrating the wall of the reservoir 20. The opening 44 is fitted with a hose to connect the pressure regulator 14 and the opening 44, so that returning fuel from the pressure regulator 14 can be guided to the opening 44. The opening 46 opens into the gap between the bottom of the reservoir 20 and the bottom 6*b* of the fuel tank 6. As shown in FIG. 1, a slight spacing is secured between the bottom of the reservoir 20 and bottom 6*b* of the fuel tank 6 by projections 28.

The jet pump body 41 is accommodated in the concave 42, and the subsequent fixing of a plug 38 to the reservoir 20 causes the jet pump body 41 to be fixed to the reservoir 20. The jet pump body 41 is provided with an opening 48 to accept returning fuel from the pressure regulator 14, a passage 50 for accepting fuel from outside the reservoir 20, and a venturi tube 52. When the jet pump body 41 is fixed to the reservoir 20, the opening 44 becomes continuous to the opening 48, and the opening 46, to the passage 50.

As returning fuel from the pressure regulator 14 is guided to the opening 44, that fuel passes through the venturi tube 52 of the jet pump 40 as indicated by arrow A. As the flow rate of returning fuel jetting out of the venturi tube 52 is fast, a negative pressure is generated in the downstream part of the venturi tube 52. This negative pressure causes, as indicated by arrow B, fuel outside the reservoir 20 to pass through the opening 46 and the passage 50 to be sucked by the jet pump 40 and discharged out of its discharge port 54.

From the discharge port 54 of the jet pump 40 are discharged returning fuel from the pressure regulator 14 and fuel sucked from outside the reservoir 20. Utilizing the flow velocity of returning fuel from the pressure regulator 14, the jet pump 40 introduces fuel outside the reservoir 20 into the reservoir 20.

The fuel discharged from the discharge port 54 of the jet pump 40 contains many bubbles. When it is powerfully discharged into the reservoir 20, the inner space of the reservoir may be filled with fuel containing many bubbles. If the reservoir 20 is filled with fuel containing bubbles, the fuel pump 34 may take in many bubbles and become vapor-locked, or the fuel containing bubbles may be supplied to the injector to disable the injector to inject the intended quantity of fuel.

In this embodiment according to the invention, in order to prevent the reservoir 20 from being filled with fuel containing bubbles, a wall 24 fully surrounding the discharge port 54 of the jet pump 40 is molded integrally with the resin-built reservoir 20. Thus, the flow delivered from the jet pump 40 is discharged into the closed space surrounded by the full-circle wall 24, the fuel in that closed space is cleared of the bubbles, and the fuel is moved outside the wall 24 after it is cleared of the bubbles, thereby preventing the presence of many bubbles in the fuel within the reservoir 20 outside the wall 24.

As shown in FIG. 2A, the wall 24 fully surrounds the discharge port 54 of the jet pump 40. Its height is less than that of the side wall of the reservoir 20. There is no particular limitation to the shape of the wall 24, but it preferably should have no corner in its planar view, i.e., be substantially oval or substantially circular, shaped like a bean, because any corner might invite concentration of bubbles in the fuel in that corner.

A partition wall 22 is formed at a central part in the full-circle wall 24, so configured that fuel delivered from the jet pump 40 flow round the partition wall 22. The fuel delivered from the jet pump 40 is discharged along the partition wall 22.

Figure 3A:
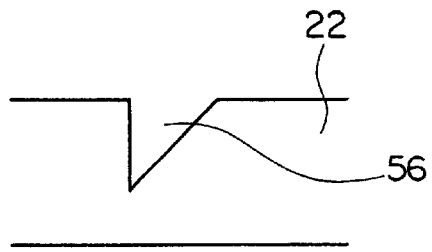
FIGS. 3A through 3C are front views of one example and its modified versions of a partition wall according to the first embodiment of the invention.
Figure 3B:
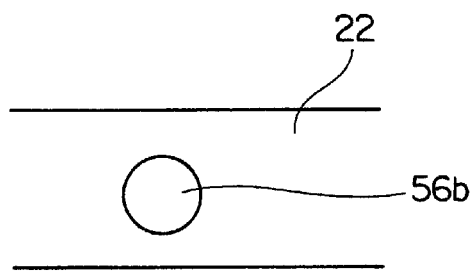
Figure 3C:
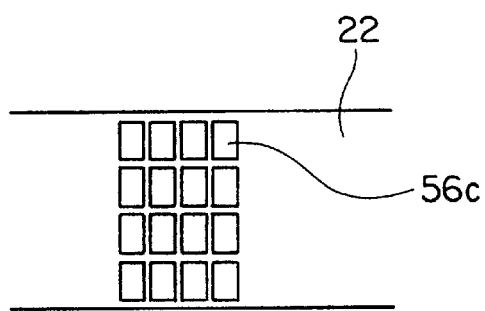

Clearances 56 and 58 are secured between the two sides of the partition wall 22 and the full-circle wall 24. The clearance 56 can be formed by notching a part of the wall 22 as shown in FIG. 3A. It is sufficient for the clearance 56 to permit the delivered flow to turn round the partition wall 22 a plurality of times, any of the hole-shaped clearance 56*b* shown in FIG. 3B, a meshed clearance 56*c* in FIG. 3C or the like may be applied as appropriate.

Incidentally, although the fuel tank in the above embodiments is made of resin, the tank may be made of the conventional material.

While the invention has been described with reference to preferred embodiments thereof, they are presented as mere examples, but nothing to limit the scope of claims for the patent. Various modifications and alterations of the specific embodiments described above can be included within the spirit and scope of the following claims.

Further, the technical elements described in this specification or illustrated in the accompanying drawings can prove technically useful either by themselves or in various combinations, but not limited to the combinations in the claims contained in the application. The aspects of the art described in this specification or illustrated in the accompanying drawings achieve a plurality of objects at the same time, and achieving any one of those objects can be technically useful in itself.

With the reservoir unit according to the invention, since projections protruding upward from the inner bottom of the reservoir and engaging holes bored in the circumference of the filter are engaged with each other thereby to constitute engaging means, at least part of the bottom of the filter can be kept in a position near the inner bottom of the reservoir, and accordingly at least part of the filter can be kept soaked in fuel even if the remaining quantity of fuel in the reservoir is very small, resulting in an increased quantity of consumable fuel.

What is claimed is:

1. A reservoir unit comprising:
    a cylindrical reservoir having a bottom arranged on the bottom of a fuel tank,
    a filter installed near the inner bottom of that reservoir, and
    a fuel pump for sucking fuel in the reservoir through the filter, wherein:
        projections protruding upward from the inner bottom of the reservoir are integrally molded, and engaging holes to engage with the projections are bored in the circumference of the filter, the projections and the holes constituting engaging means.

2. A reservoir unit as claimed in claim 1, wherein said projections are snap fits.

3. A reservoir unit as claimed in claim 1, wherein said fuel tank is made of resin.

4. A reservoir unit as claimed in claim 2, wherein said fuel tank is made of resin.

* * * * *